US009837029B2

(12) United States Patent
Zhao et al.

(10) Patent No.: US 9,837,029 B2
(45) Date of Patent: Dec. 5, 2017

(54) LIQUID CRYSTAL DISPLAY PANEL AND LIQUID CRYSTAL DISPLAY DEVICE

(71) Applicant: SHENZHEN CHINA STAR OPTOELECTRONICS TECHNOLOGY CO. LTD., Guangdong (CN)

(72) Inventors: Wenqin Zhao, Guangdong (CN); Yuyeh Chen, Guangdong (CN); Tao He, Guangdong (CN)

(73) Assignee: SHENZHEN CHINA STAR OPTOELECTRONICS TECHNOLOGY CO. LTD., Guangdong (CN)

( * ) Notice: Subject to any disclaimer, the term of this patent is extended or adjusted under 35 U.S.C. 154(b) by 35 days.

(21) Appl. No.: 14/772,392

(22) PCT Filed: Jun. 5, 2015

(86) PCT No.: PCT/CN2015/080875
§ 371 (c)(1),
(2) Date: Sep. 3, 2015

(87) PCT Pub. No.: WO2016/176890
PCT Pub. Date: Nov. 10, 2016

(65) Prior Publication Data
US 2016/0329023 A1    Nov. 10, 2016

(30) Foreign Application Priority Data
May 6, 2015 (CN) .......................... 2015 1 0226977

(51) Int. Cl.
G09G 3/36        (2006.01)
G02B 27/22       (2006.01)
G09G 3/00        (2006.01)

(52) U.S. Cl.
CPC ....... *G09G 3/3614* (2013.01); *G02B 27/2264* (2013.01); *G09G 3/003* (2013.01);
(Continued)

(58) Field of Classification Search
CPC .. G09G 3/3614; G09G 3/3607; G09G 3/3674; G09G 2320/0209;
(Continued)

(56) References Cited

U.S. PATENT DOCUMENTS 6,327,008 B1 * 12/2001 Fujiyoshi ............. G09G 3/3607
                                                        345/96
9,083,965 B2    7/2015 Imai et al.
(Continued)

FOREIGN PATENT DOCUMENTS

CN        1156265 A       8/1997
CN      102341744 A       2/2012
(Continued)

Primary Examiner — Christopher E Leiby
(74) Attorney, Agent, or Firm — Mark M. Friedman

(57) ABSTRACT

A liquid crystal display panel is provided by the present invention, which comprises a plurality of data lines, a plurality of scanning lines, and a plurality of pixel units; wherein the pixel units of each column comprise two types of pixel units disposed interleaved, the adjacent pixel units are different types, and each of the data lines connects to the same type of adjacent pixel units. The present invention completes driving a plurality of adjacent row pixel units at the same time by making data lines connect with the same type pixel units.

10 Claims, 4 Drawing Sheets

(52) U.S. Cl.
CPC ......... *G09G 3/3607* (2013.01); *G09G 3/3674* (2013.01); *G09G 2320/0209* (2013.01); *G09G 2320/0247* (2013.01); *G09G 2320/0257* (2013.01); *G09G 2340/0435* (2013.01)

(58) Field of Classification Search
CPC ... G09G 2320/0252; G09G 2320/0247; G09G 2320/0257; G09G 2310/0213; G02B 27/2264
See application file for complete search history.

(56) References Cited

U.S. PATENT DOCUMENTS

| | | | | |
|---|---|---|---|---|
| 2011/0169871 | A1* | 7/2011 | Suzuki | G09G 3/003 345/690 |
| 2012/0249907 | A1* | 10/2012 | Kimura | G02F 1/13624 349/38 |
| 2014/0009458 | A1* | 1/2014 | Nam | G09G 3/3696 345/212 |
| 2016/0351136 | A1* | 12/2016 | He | G09G 3/3614 |

FOREIGN PATENT DOCUMENTS

| | | |
|---|---|---|
| CN | 102879965 A | 1/2013 |
| CN | 103529610 A | 1/2014 |
| JP | 2008070406 A | 3/2008 |

* cited by examiner

LIQUID CRYSTAL DISPLAY PANEL AND LIQUID CRYSTAL DISPLAY DEVICE

BACKGROUND OF HE INVENTION

Field of Invention

The present invention relates to the field of liquid crystal displays, and more particularly to a liquid crystal display panel and a liquid crystal display device.

Description of Prior Art

With social development, more people are using liquid crystal displays. Now, a terrific liquid crystal display has to not only provide terrific performance in 2-D but also provide better 3-D performance.

Please refer to FIG. 1, which is a structural drawing of a liquid crystal display panel of a conventional art. The liquid crystal display panel 10 comprises data lines 11, scanning lines 12, red sub-pixels (a positive polarity red sub-pixel R+ and a negative polarity red sub-pixel R−), green sub-pixels (a positive polarity green sub-pixel G+ and a negative polarity green sub-pixel G−), and blue sub-pixels (a positive polarity blue sub-pixel B+ and a negative polarity blue sub-pixel B−), the red sub-pixels, the green sub-pixels, and the blue sub-pixels are disposed interleaved with the data lines 11 and scanning lines 12. Wherein the data lines are used to transmit data signals to each color sub-pixel, the scanning lines are used to transmit scanning signals to each color sub-pixel, and each color sub-pixel displays according to corresponding data signals and corresponding scanning signals. One scanning line 12 of the liquid crystal display panel inputs one scanning signal to one row of sub-pixels, one data line 11 of the liquid crystal display panel inputs one data signal to the same color sub-pixels of one column of sub-pixels. In order to avoid polarization of liquid crystal molecular, every sub-pixel will change polarity after one frame image or several frame images, which means positive polarity red sub-pixels change to negative polarity red sub-pixels.

Please refer to FIG. 1. When displaying odd image frames, sub-pixels of odd columns are positive polarities, and sub-pixels of even columns are negative polarities; when displaying even image frames, sub-pixels of even columns are positive polarities, and sub-pixels of odd columns are negative polarities. However, while changing the polarities of the sub-pixels of the liquid crystal display panel of the above structure by columns, flicker, image sticking, and crosstalk is easily generated.

Based on the above, manufacturers of liquid crystal display panels develop another column-rotation liquid crystal display panel as in FIG. 2, which is another structural drawing of a liquid crystal display panel of the conventional art. The liquid crystal display panel 20 also comprises data lines 21, scanning lines 22, red sub-pixels, green sub-pixels, and blue sub-pixels. The red sub-pixels, the green sub-pixels, and the blue sub-pixels are disposed interleaved with the data lines 21 and scanning lines 22. In FIG. 2, a polarity of each sub-pixel of the liquid crystal display panel is different from the adjacent sub-pixels; with the column-rotation of each image frame, polarity change of each sub-pixel is also accomplished.

However, when the liquid crystal display panel performs 3-D display, the refresh rate of the liquid crystal display panel 20 is higher, with two adjacent rows or several rows of sub-pixels needing to input data signals at the same time. In the structure, the data lines 21 are unable to input different data signals to different color sub-pixels, so it is impossible to accomplish inputting different data signals to the two adjacent rows or the several rows of sub-pixels, the 3-D display performance of the structure of the liquid crystal display panel 20 is poor or the manufacturing cost is higher.

Hence, a liquid crystal display panel and a liquid display device are needed for solving the problem in the conventional art.

SUMMARY OF THE INVENTION

An objective of the present invention is to provide a liquid crystal display panel and a liquid crystal display device, which have better 3-D performance and lower manufacturing cost, to solve issues of poorer 3-D performance and higher manufacturing cost of a liquid crystal display panel and a liquid crystal display device in the conventional art.

To solve the above issues, the present invention provides a technical solution as follows:

The present invention provides a liquid crystal display panel, which comprises:

A plurality of data lines, being used to transmit data signals;

A plurality of scanning lines, being used to transmit scanning signals;

A plurality of pixel units, being disposed interleaved with the data lines and the scanning lines, the pixel units comprise red pixel units, green pixel units, and blue pixel units, used to display an image according to the data signals and the scanning signals;

Wherein the pixel units of each column comprise two types of the pixel units disposed interleaved, the adjacent pixel units are different types, each of the data lines connects to the same type of adjacent pixel units;

Wherein polarities of the adjacent pixel units are reversed, each of the pixel units comprises two different types and adjacent pixel units.

In the liquid crystal display panel, while the liquid crystal display panel performs 2-D display, the scanning lines performs progressive scanning according to rows.

In the liquid crystal display panel, while the liquid crystal display panel performs 3-D display, the scanning lines performs progressive scanning according to scanning-line-groups, wherein the scanning-line-groups comprise a plurality of the adjacent scanning lines.

In the liquid crystal display panel, the scanning-line-groups comprise the 2-4 adjacent scanning lines.

In the liquid crystal display panel, a refreshing rate of the liquid crystal display panel is 120 Hz to 240 Hz.

The present invention further provides liquid crystal display device, which comprises:

A backlight source, being used to provide display light source;

A shatter glasses, being used to perform 3-D image display; and

A liquid crystal display panel, comprising:

A plurality of data lines, being used to transmit data signals;

A plurality of scanning lines, being used to transmit scanning signals;

A plurality of pixel units, being disposed interleaved with the data lines and the scanning lines, the pixel units comprise red pixel units, green pixel units, and blue pixel units, used to display an image according to the data signals and the scanning signals;

Wherein the pixel units of each column comprises two types of the pixel units disposed interleaved, the adjacent pixel units are different types, each of the data lines connects to the same type of adjacent pixel units;

In the liquid display device, polarities of the adjacent pixel units are reversed.

In the liquid display device, each of the pixel units comprises two different types and adjacent pixel units.

In the liquid display device, while the liquid crystal display panel performs 2-D display, the scanning lines performs progressive scanning according to rows.

In the liquid display device, while the liquid crystal display panel performs 3-D display, a refreshing frequency of the shatter glasses are the same as a frequency of the liquid crystal display panel.

In the liquid display device, of the scanning-line-groups comprise the 2-4 adjacent scanning lines.

In the liquid display device, a refreshing rate of the liquid crystal display panel is 120 Hz to 240 Hz.

With respect with the liquid crystal display panel and the liquid crystal device of the conventional art, the liquid crystal display panel and the liquid crystal device of the present invention complete driving a plurality of adjacent row pixel units at the same time, by making data lines connect with the same type pixel units, thus the liquid crystal display panel has better 3-D display performance and lower manufacturing cost; which solves issues of poorer 3-D display performance and higher manufacturing cost of a liquid crystal display panel and a liquid crystal display device in the conventional art.

In order to make the above description more easily understood, below are embodiments with accompany drawings and a detailed explanation.

DETAILED DESCRIPTION OF THE PREFERRED EMBODIMENTS

Figure 1:
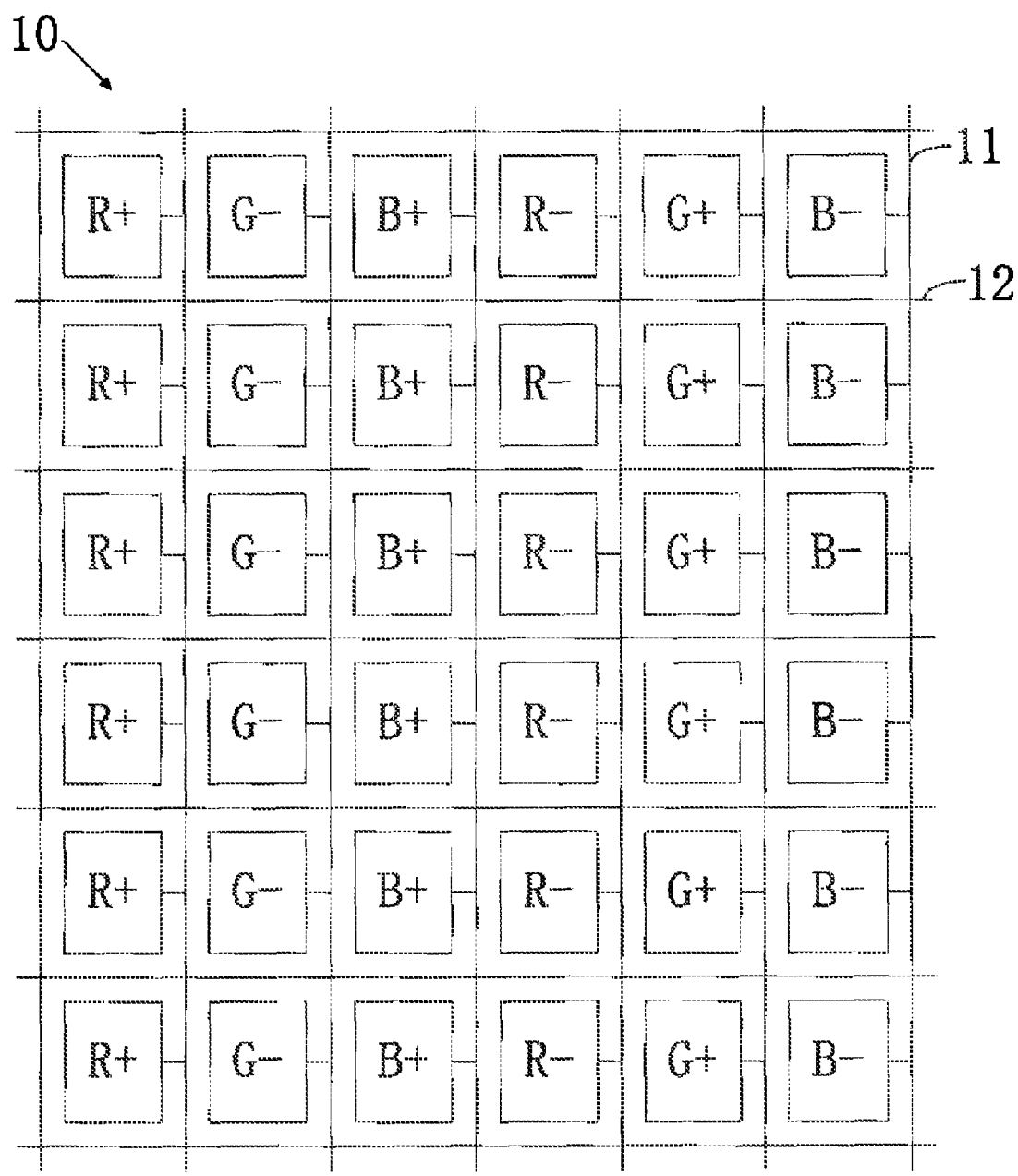
FIG. 1 is a structural drawing of a liquid crystal display panel of a conventional art.
Figure 2:
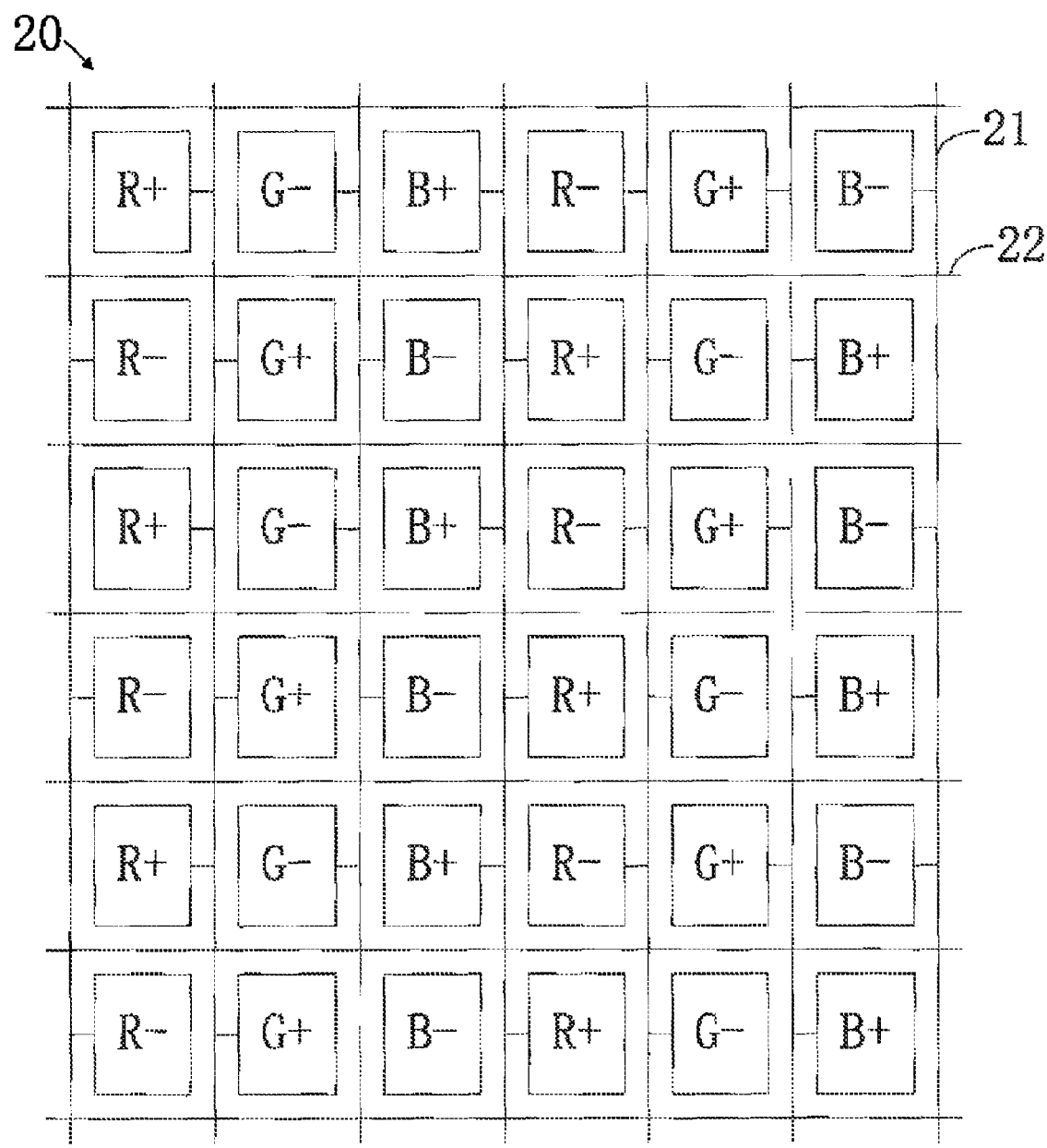
FIG. 2 is another structural drawing of a liquid crystal display panel of a conventional art.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

In the drawings, units with similar structures are marked with the same labels.

Figure 3A:
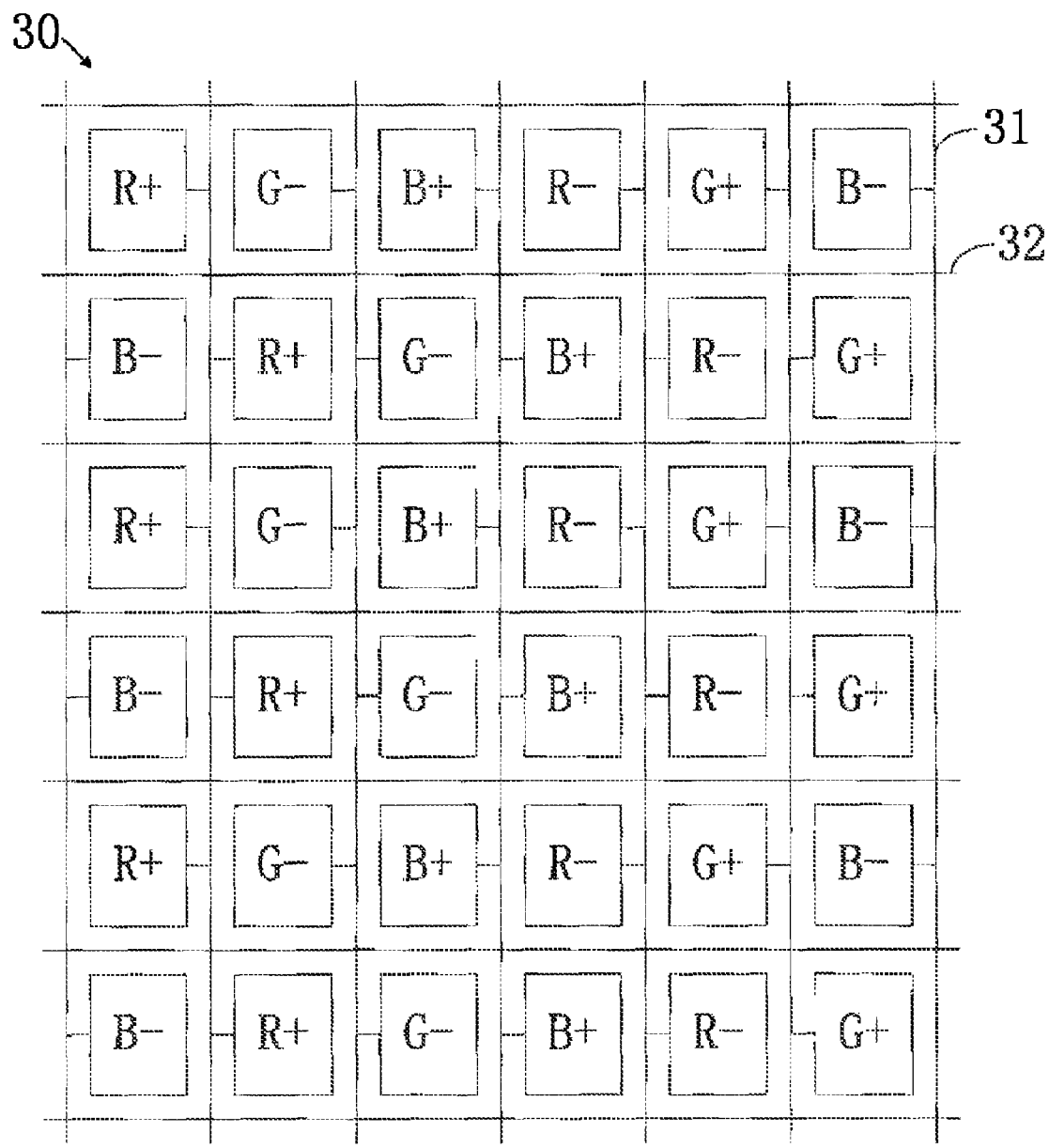
FIG. 3A is a first structural drawing of a liquid crystal display panel of a preferred embodiment of the present invention.
Figure 3B:
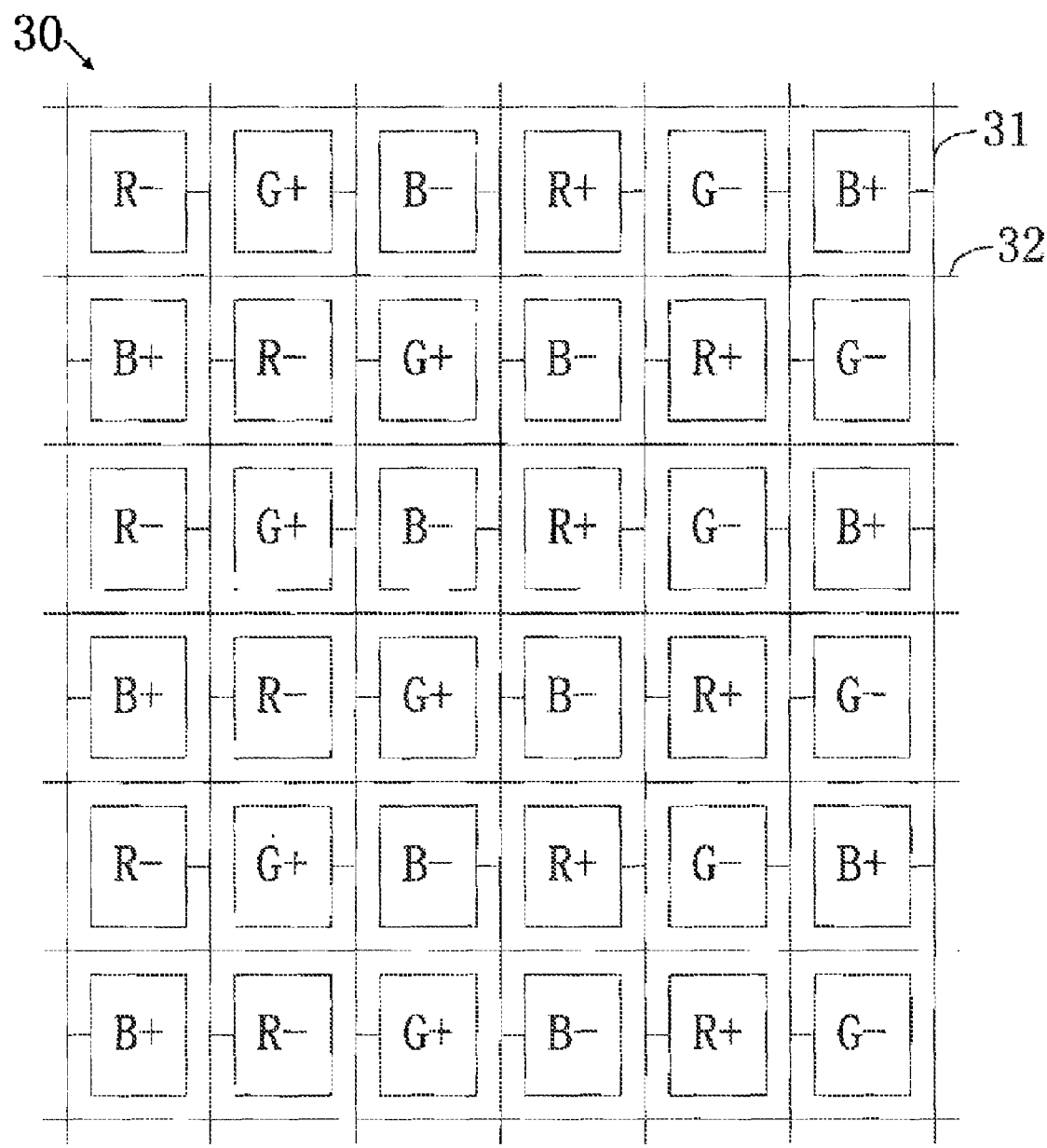
FIG. 3B is a second structural illustrative drawing of a liquid crystal display panel of a preferred embodiment of the present invention.

Please refer to FIG. 3A and FIG. 3B. FIG. 3A is first structural drawing of a liquid crystal display panel of a preferred embodiment of the present invention, FIG. 3B is second structural drawing of a liquid crystal display panel of a preferred embodiment of the present invention. A liquid crystal display panel 30 of the preferred embodiment comprises a plurality of data lines 31, a plurality of scanning lines 32, and a plurality of pixel units. The data lines are used to transmit data signals, the scanning lines are used to transmit scanning signals, the pixel units are disposed interleaved with the data lines 31 and scanning lines 32, the pixel units comprise red sub-pixels (a positive polarity red sub-pixel R+ and a negative polarity red sub-pixel R−), green sub-pixels (a positive polarity green sub-pixel G+ and a negative polarity green sub-pixel G−), and blue sub-pixels (a positive polarity blue sub-pixel B+ and a negative polarity blue sub-pixel B−), the pixel units display an image according to the data signals and the scanning signals.

In the liquid crystal display panel of the preferred embodiment, each column pixel units comprises two types pixel units disposed interleaved, such as a red pixel unit and a green pixel unit disposed interleaved, a green pixel unit and a blue pixel unit disposed interleaved, a red pixel unit and a blue pixel unit disposed interleaved, and so on. As FIG. 3A and FIG. 3B show, the first column pixel units are a red pixel unit and a blue pixel unit disposed interleaved, the second column pixel units are a green pixel unit and a red pixel unit disposed interleaved, . . . , the sixth column pixel units are a blue pixel unit and a green pixel unit disposed interleaved.

Each pixel unit and adjacent pixel units are different types, and each of the pixel units comprises two different types and adjacent pixel units. Take the red pixel unit in the second row and the second column as an example. A blue pixel unit is at the left side of the red pixel unit, green pixel units are at the top, bottom, and right sides of the red pixel unit.

Each of the data lines 31 connects to the same type of adjacent pixel units, the pixel units in each column comprise two types of the pixel units which are disposed in an interleaved manner, so the data lines 31 connect with left pixel units at odd rows, connect with right pixel units at even rows.

While using the liquid crystal display panel 30 of the preferred embodiment, polarities of adjacent data lines 31 are reversed, and perform column reversion according to the image frame. FIG. 3A is a structural drawing of the pixel units of the liquid crystal display panel of odd image frames. FIG. 3B is a structural drawing the pixel units of the liquid crystal display panel of a preferred embodiment of the present invention.

While the liquid crystal display panel 30 displays odd image frames, the data signals of the odd data lines are negative-polarity signals, and the data signals of the even data lines are positive-polarity signals. So the odd data lines input negative-polarity signals to odd column pixel units connected at right sides of the odd data lines, and input negative-polarity signals to even column pixel units connected at left sides of the odd data lines. The even data lines input negative-polarity signals to odd column pixel units connected at right sides of the odd data lines, and input positive-polarity signals to even column pixel units connected at left sides of the odd data lines. This makes the polarities of adjacent pixel units reversed, which prevents the imprecise common voltage compensation, which causes flicker, image sticking, and crosstalk.

While the liquid crystal display panel 30 displays even image frames, the data signals of the odd data lines are positive-polarity signals, and the data signals of the even data lines are negative-polarity signals. So the odd data lines input positive-polarity signals to odd column pixel units connected at right sides of the odd data lines, and input positive-polarity signals to even column pixel units connected at left sides of the odd data lines. The even data lines input negative-polarity signals to odd column pixel units connected at right sides of the odd data lines, and input negative-polarity signals to even column pixel units connected at left sides of the odd data lines. This makes the polarities of adjacent pixel units reversed, and completes the dot inversion of adjacent pixel units of adjacent image frames, on the basis of preventing flicker, image sticking, and crosstalk, further preventing polarization of liquid crystal molecules.

While the liquid crystal display panel 30 of the preferred embodiment performs 2-D display, with a lower refreshing frequency of the image display, it is possible to progressively scan all of the scanning lines 32 of the liquid crystal display panel 30 according to rows to ensure the image display quality of 2-D display.

While the liquid crystal display panel 30 of the preferred embodiment performs 3-D display, it is necessary to use 3-D shattered glasses to display left-eye images and right-eye images at the same time. In other words, it is necessary to display two frame images while performing 3-D display in the display interval of one frame image of 2-D display, so a refreshing frequency of an image display is higher; a refreshing frequency of a general liquid crystal display panel 30 is 120 Hz to 240 Hz. In order to guarantee that the data lines are able to perform a fully-charge operation to the pixel units by the data signals, all of the scanning lines 32 of the liquid crystal display panel 30 are able to perform a progressive scanning operation according to the scanning-line-groups, wherein the scanning-line-groups comprise 2-4 of the adjacent scanning lines 32. Thus the data lines 31 are able to input data signals to 2-4 row pixel units to guarantee that each pixel unit has enough charging time.

Because the data lines 31 of the same column transmit to the same type of pixel units (red pixel units, green pixel units, or blue pixel units), transmitting data signals to the pixel units corresponding to the scanning-line-groups at the same time, which only decreases a resolution rate of a whole image, in other words, the original 2-4 pixel units are combined as a pixel unit, but do not to effect the display quality of 3-D images.

So with each of the data lines connecting to the same type of adjacent pixel units, the liquid crystal display panel of the present invention completes driving a plurality of adjacent row pixel units at the same time, thus the liquid crystal display panel has better 3-D display performance and lower manufacturing cost.

The present invention further provides a liquid crystal display device, which comprises a backlight source, a shatter glasses, and a liquid crystal display panel. The backlight source provides display light source, and the shatter glasses perform 3-D image display.

The liquid crystal display panel comprises a plurality of data lines, a plurality of scanning lines, and a plurality of pixel units. The data lines are used to transmit data signals, and the scanning lines are used to transmit scanning signals. The pixel units are disposed interleaved with the data lines and the scanning lines, the pixel units comprise red pixel units, green pixel units, and blue pixel units, and used to display an image according to the data signals and the scanning signals.

Preferably, the pixel units of each column comprise two types of the pixel units disposed interleaved, the pixel unit and adjacent pixel units are different types, and each of the data lines connects to the same type of adjacent pixel units;

Preferably, polarities of the adjacent pixel units are reversed, each of the pixel units comprises two different types and adjacent pixel units.

Preferably, while the liquid crystal display panel performs 2-D display, the scanning lines perform progressive scanning according to rows.

Preferably, while the liquid crystal display panel performs 3-D display, the scanning lines perform progressive scanning according to scanning-line-groups, wherein the scanning-line-group comprise 2-4 adjacent scanning lines.

Preferably, a refreshing rate of the liquid crystal display panel is 120 Hz to 240 Hz.

Preferably, while the liquid crystal display panel performs 3-D display, in order to guarantee the 3-D display quality of the liquid crystal display device, a refreshing frequency of the shatter glasses is the same as a frequency of the liquid crystal display panel.

A precise operational theory of the liquid crystal display device is similar to or the same as the relational description in the preferred embodiments of the liquid crystal display panel mentioned above. Please kindly refer to the description of the preferred embodiments of the liquid crystal display panel mentioned above.

With respect with the liquid crystal display panel and the liquid crystal device of the conventional art, the liquid crystal display panel and the liquid crystal device of the present invention complete driving a plurality of adjacent row pixel units at the same time, by making data lines connect with the same type pixel units, thus the liquid crystal display panel has better 3-D performance and lower manufacturing cost; which solves issues of poorer 3-D performance and higher manufacturing cost of a liquid crystal display panel and a liquid crystal display device in the conventional art.

In summary, although the present invention has been described in preferred embodiments above, the preferred embodiments are not intended to limit the invention. One of ordinary skill in the art, without departing from the spirit and scope of the invention within, can make all species of modifications and variations, thus the scope of the invention as defined by the claims shall prevail.

What is claimed is:

1. A liquid crystal display panel, comprising:
   a plurality of data lines, being used to transmit data signals and arranged in a column direction;
   a plurality of scanning lines, being used to transmit scanning signals and arranged in a row direction, wherein the plurality of scanning lines comprise at least three adjacent scanning lines;
   wherein the pixel units comprise red sub-pixel units, green sub-pixel units, and blue sub-pixel units, and the sub-pixel units are used to display an image according to the data signals and the scanning signals;
   the plurality of sub-pixel units being disposed interleaved with the data lines and the scanning lines;
   wherein each column comprises only sub-pixel units of two colors alternated in the column, each directly adjacent data line comprises a common colored sub-pixel unit, each three adjacent data lines of the plurality of data lines is only connected to the common colored sub-pixel units between columns; and,
   wherein polarities of each directly adjacent data line are reversed.

2. The liquid crystal display panel according to claim 1, wherein while the liquid crystal display panel performs 2-D display, the scanning lines perform progressive scanning according to rows.

3. The liquid crystal display panel according to claim 1, wherein while the liquid crystal display panel performs 3-D display, the scanning lines perform progressive scanning according to scanning-line-groups, wherein each of the scanning-line-groups comprises a plurality of the adjacent scanning lines.

4. The liquid crystal display panel according to claim 3, wherein each of the scanning-line-groups comprises 2-4 adjacent scanning lines.

5. The liquid crystal display panel according to claim 3, wherein a refreshing rate of the liquid crystal display panel is 120 Hz to 240 Hz.

6. A liquid crystal display device, comprising:
   a backlight source, being used to provide display light source;
   a shatter glasses, being used to perform 3-D image display; and
   a liquid crystal display panel, comprising:
      a plurality of data lines, being used to transmit data signals and arranged in a column direction;
      a plurality of scanning lines, being used to transmit scanning signals and arranged in a row direction, wherein the plurality of scanning lines comprise at least three adjacent scanning lines;
      wherein the pixel units comprise red sub-pixel units, green sub-pixel units, and blue sub-pixel units, and the sub-pixel units are used to display an image according to the data signals and the scanning signals;
      the plurality of sub-pixel units being disposed interleaved with the data lines and the scanning lines;
      wherein each column comprises only sub-pixel units of two colors alternated in the column, each directly adjacent data line comprises a common colored sub-pixel unit, each three adjacent data lines of the plurality of data lines is only connected to the common colored sub-pixel units between columns; and,
      wherein polarities of each directly adjacent data line are reversed.

7. The liquid crystal display device according to claim 6, wherein while the liquid crystal display panel performs 2-D display, the scanning lines perform progressive scanning according to rows.

8. The liquid crystal display device according to claim 6, wherein while the liquid crystal display panel performs 3-D display, a refreshing frequency of the shatter glasses is the same with a frequency of the liquid crystal display panel.

9. The liquid crystal display device according to claim 8, wherein each of the scanning-line-groups comprises 2-4 adjacent scanning lines.

10. The liquid crystal display device according to claim 8, wherein a refreshing rate of the liquid crystal display panel is 120 Hz to 240 Hz.

\* \* \* \* \*